United States Patent [19]

Ladd et al.

[11] 3,925,931
[45] Dec. 16, 1975

[54] VEHICLE WINDOW CONTROL SYSTEM
[75] Inventors: Floyd N. Ladd, Warren; Donald G. Stacy, Plymouth, both of Mich.
[73] Assignee: Ford Motor Company, Dearborn, Mich.
[22] Filed: Aug. 5, 1974
[21] Appl. No.: 489,273

[52] U.S. Cl. .................. 49/227; 49/103; 49/350
[51] Int. Cl.² .................................. E05F 11/52
[58] Field of Search ............ 49/227, 103, 348–351, 49/353, 374, 375

[56] References Cited
UNITED STATES PATENTS
2,876,003  3/1959  Probst ................................. 49/227
3,413,760  12/1968  Gorys et al. ......................... 49/227

Primary Examiner—Kenneth Downey
Attorney, Agent, or Firm—John J. Roethel; Keith L. Zerschling

[57] ABSTRACT

A vehicle window control system for controlling the movement of a window panel during the lowering and raising thereof. The control system comprises a window regulator mechanism mounted on a vertical panel of a vehicle body structure. The window regulator is of the swingable arm type.

An important feature of the control system is the provision of a pair of proximately spaced guide rods supported on the body structure. The guide rods are curved laterally relative to the direction of movement of the window panel. A carriage to which the window panel is affixed straddles the guide rods for sliding movement thereon. The carriage has two point engagement with one of the pair of guide rods and single point engagement with the other one.

A coupling means couples the regulator arm to the carriage substantially intermediate the two point engagement of the carriage with the one guide rod.

The carriage during sliding movement along the guide rods causes the window panel to follow a predetermined lateral path of movement corresponding to the guide rod curvature. This occurs as the window panel is lowered or raised in response to swinging movement of the regulator arm.

4 Claims, 6 Drawing Figures

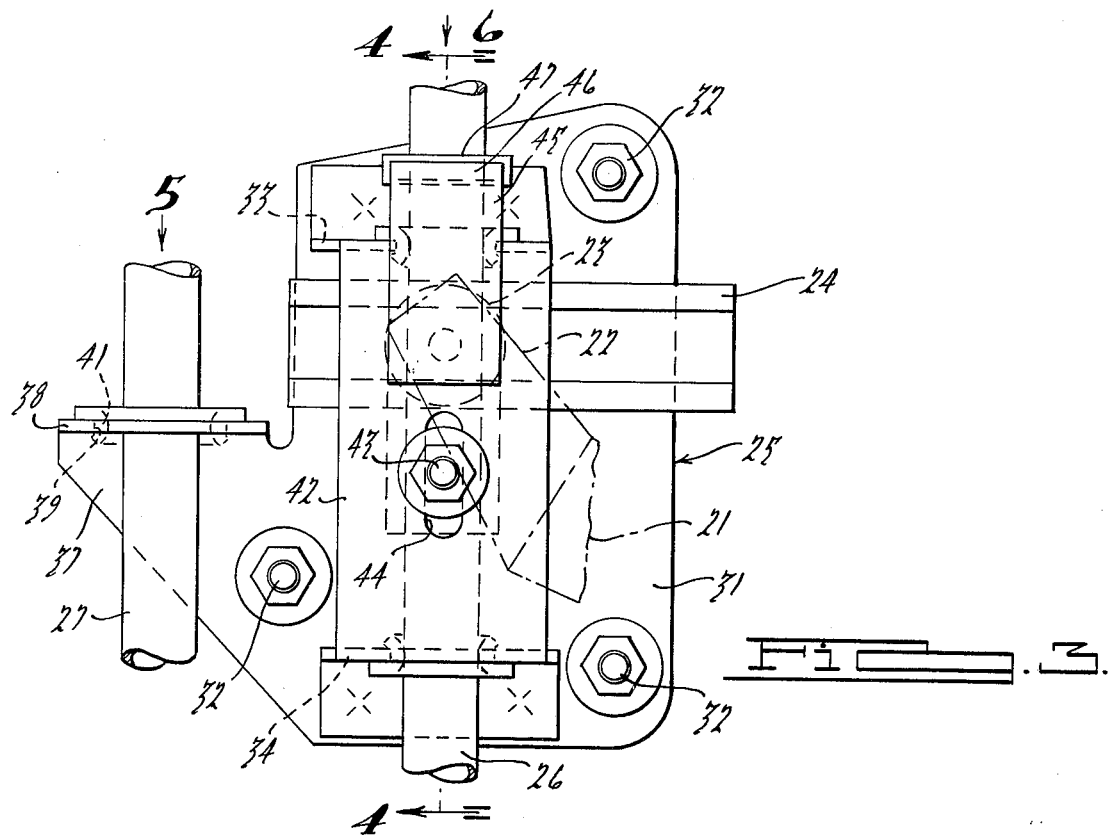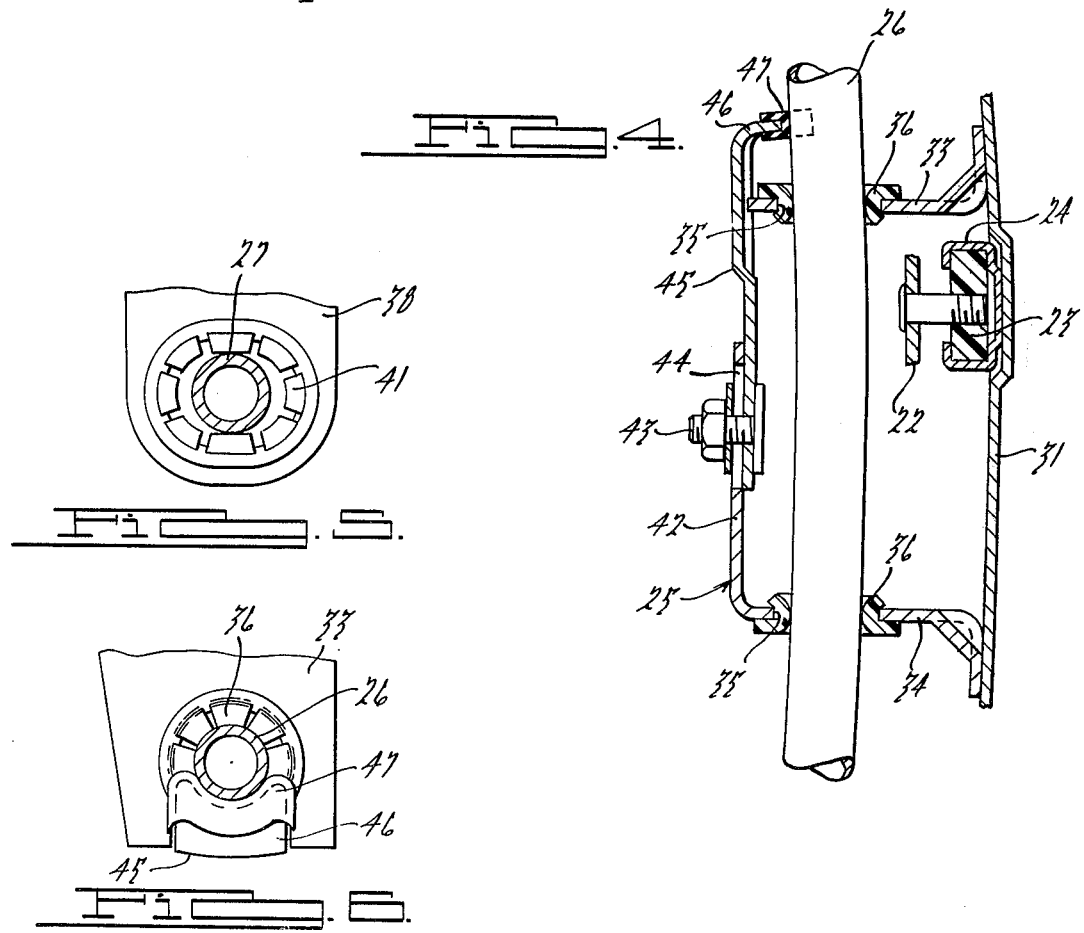

3,925,931

VEHICLE WINDOW CONTROL SYSTEM

BACKGROUND OF THE INVENTION

U.S. patent application Ser. No. 457,534, filed Apr. 3, 1974, now Pat. No. 3,890,742 issued June 24, 1975 for a "Window Regulator Mechanism" in the name of F. N. Ladd et al. and assigned to the assignee of the present application discloses a window regulator mechanism for lowering or raising, particularly in a vehicle body structure, a window panel divided into separately movable ventilation and visibility sections. The ventilation section has a relatively small panel and is lowered and raised by a regulator arm fixed at one end to a gear sector and at its other end to a channel fixed to a carriage on which the ventilation section is fixedly mounted. The carriage is slidable on spaced guide rods adapted to be secured to an inner panel of the vehicle body structure by suitable support brackets.

As best seen in U.S. Pat. No. 3,659,381, issued May 2, 1972 to Stewart M. Frey et al for "Vent Window System for Vehicle Body Structure", the divided window panel, and therefore its sections, conventionally is laterally curved from top to bottom to fit the contour of the vehicle body structure or door structure, the vehicle body being wider below its belt line than above the belt line.

Because of the curvature of the body structure, the curved window section must be moved in a curved path to maintain proper relationship to the sealing strip around the window frame portion of the body structure and to the abutting edge of the visibility section of the window panel.

It is an object of the present invention to provide an improved construction and arrangement for controlling the movement of the ventilation panel or section of the window panel along curved guide rods, the curvature of the guide rods being laterally of the direction of movement of the ventilation section as it moves up or down in the body structure.

It is a further object to provide an improved adjustable upstop affording greater repeatability of the final position of the ventilation section in its closed or sealed position relative to the window opening.

It is yet a further object to provide a construction and arrangement in which the ventilation section is maintained in a highly stable condition in all positions between a fully raised or fully lowered position.

SUMMARY OF THE INVENTION

The present invention relates to a vehicle window control system for controlling the movement of a window panel during the lowering and raising thereof. The control system comprises a window regulator mechanism mounted on a vertical panel of a vehicle body structure. The window regulator is of the swingable arm type.

An important feature of the control system is the provision of a pair of proximately spaced guide rods supported on the body structure. The guide rods are curved laterally relative to the direction of movement of the window panel. A carriage to which the window panel is affixed straddles the guide rods for sliding movement thereon. The carriage has two point engagement with one of the pair of guide rods and single point engagement with the other one.

A coupling means couples the regulator arm to the carriage substantially intermediate the two point engagement of the carriage with the one guide rod.

The carriage during sliding movement along the guide rods causes the window panel to follow a predetermined lateral path of movement corresponding to the guide rod curvature. This occurs as the window panel is lowered or raised in response to swinging movment of the regulator arm.

Preferably, an upstop means is adjustably mounted on the carriage, the upstop means having bearing engagement above the carriage with the one guide rod. The upstop means is positioned to abut a stop on the vehicle body structure to limit upward movement of the window panel at precisely the same position every time the window panel is raised.

DESCRIPTION OF THE DRAWINGS

Other objects, advantages and features of the present invention will become more apparent as this description proceeds, reference being had to the accompanying drawing, wherein:

FIG. 3 is an enlarged fragmentary view of the area within the irregular line 3 of FIG. 1;

FIG. 4 is a section view on the line 4—4 of FIG. 3;

FIG. 5 is a fragmentary view in the direction of the arrow 5 in FIG. 3; and

FIG. 6 is a fragmentary view in the direction of the arrow 6 in FIG. 3.

DETAILED DESCRIPTION OF THE INVENTION

Figure 1:
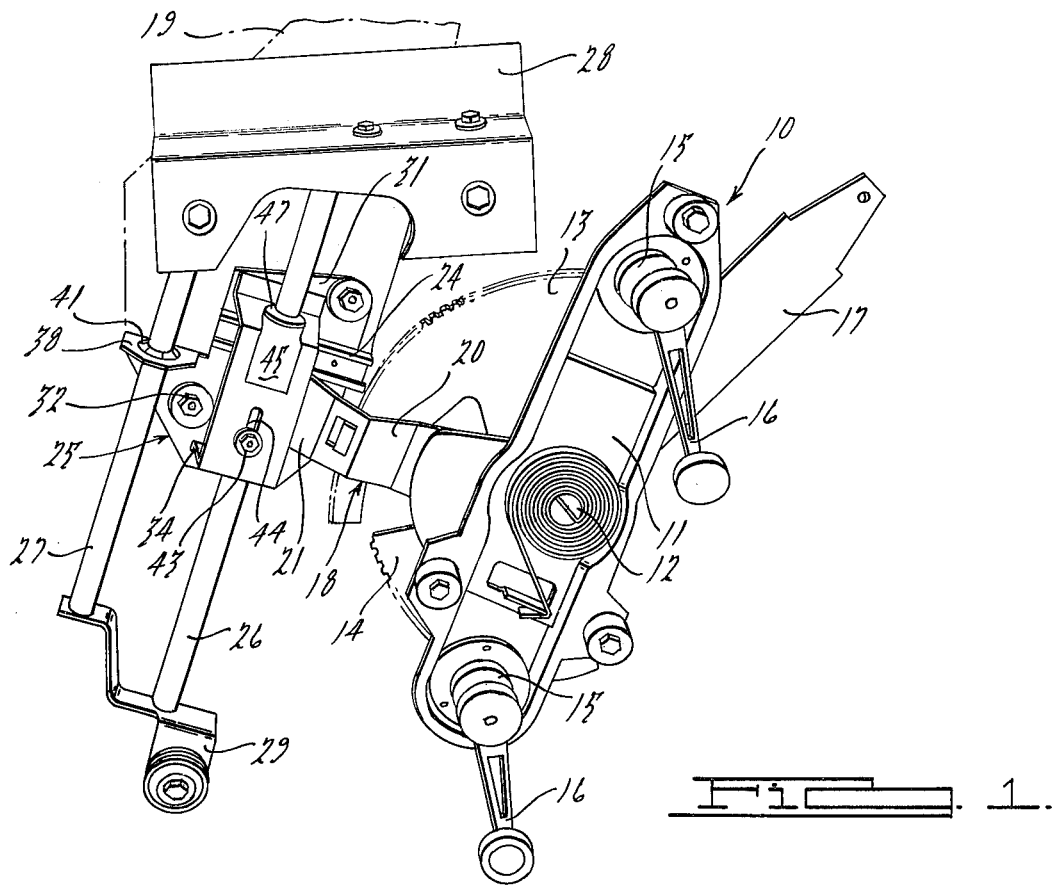
FIG. 1 is a perspective view of the window control system embodying the present invention as it would appear from the inner side of the vehicle body structure or vehicle door.

Referring now to the drawing, there is illustrated a window regulator mechanism generally designated 10, particularly suited for lowering and raising a divided window panel of the type shown in U.S. Pat. No. 3,659,381. The window regulator 10, as more fully described in application Ser. No. 457,534, comprises a mounting plate 11 carrying a pivot shaft 12 on which a pair of gear sectors 13 and 14 are journalled for independent rotation by independent drive means. The drive means are shown as conventional window regulator mechanism pinion and clutch assemblies 15, each having a manual crank handle 16 coupled to a pinion shaft.

The gear sector 13 has a regulator drive arm 17 fixed to it, the arm 17 being adapted to be coupled to the visibility or larger section of a divided window panel. The gear sector 14 has a regulator drive arm 18 coupled to it, the arm 18 being adapted to be coupled to the ventilation or smaller section 19 of a divided window panel. The drive arm 18 is somewhat shorter than the drive arm 17.

The drive arm 18 is articulated intermediate its ends and comprises two sections 20 and 21. Section 20 is fixed to the gear sector 14 and is swingable in the plane of rotation of the gear sector 14. The manner in which the arm sections 20 and 21 are articulated to each other is fully explained in our copending application for "Window Regulator Mechanism", Ser. No. 489,274, filed Aug. 5, 1974, and assigned to the assignee of this application. Arm section 21 at its free end 22 (see FIG. 2) carries a slide member 23 slidably engaged in a channel 24 secured to a bracket or carriage 25 embodying the present invention. As will be more fully explained, the carriage 25 is slidable on spaced guide rods 26 and 27 adapted to be mounted on a vehicle body structure, such as a vehicle door inner panel, by suitable mounting brackets 28–29.

The guide rods 26 and 27 are curved laterally outwardly or arched outwardly of an inner panel of a vehicle door on which the regulator mounting plate 11 and brackets 28 and 29 are mounted. This is necessary because the ventilation section 19 is curved. Also, the ventilation section must follow the curvature or tumblehome of the upper portion of the vehicle door so as to properly seal against the window opening sealing strip in fully closed position.

Figure 2:
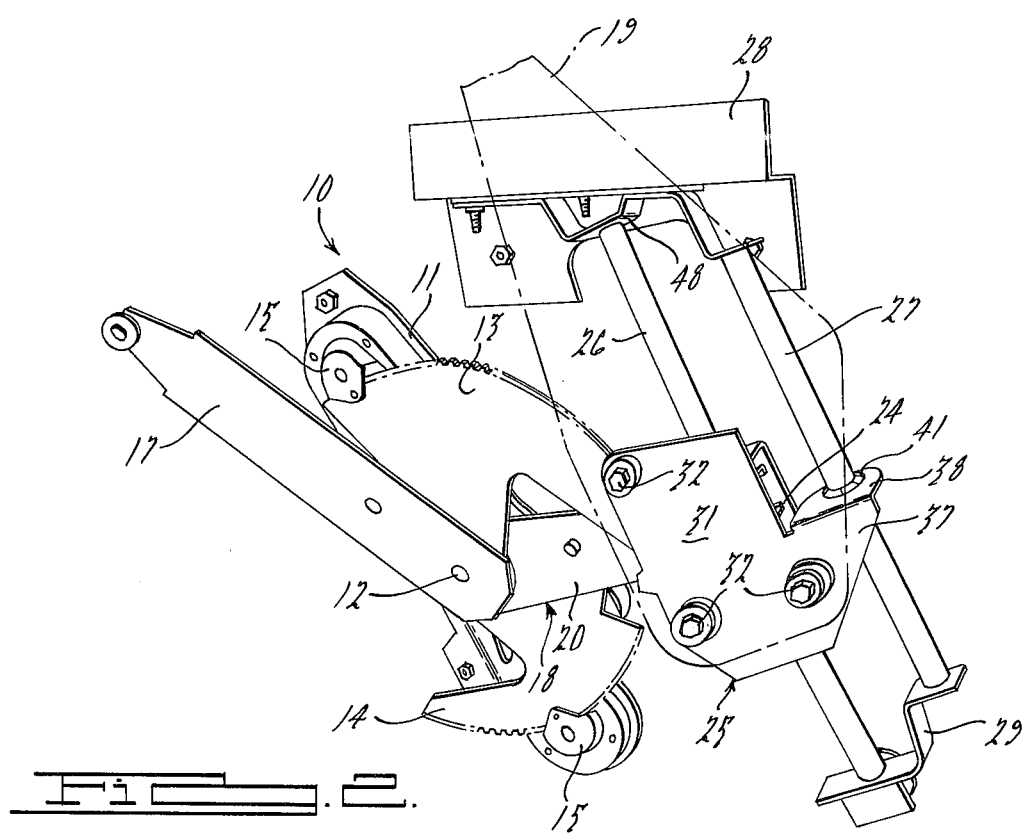
FIG. 2 is a perspective view looking at the window control system of FIG. 1 from the opposite side.

The carriage 25 comprises a substantially rectangular vertical plate 31 on which the ventilation section 19 is adapted to be mounted, as best seen in FIG. 2. The ventilation section 19 is held by rubber cushioned bolts 32. Welded to the plate 31 are vertically spaced upper and lower flanges 33 and 34. The flanges 33 and 34 have aligned circular apertures 35 which receive guide bushings 36, preferably of low friction plastic. The bushings 35 encompass the guide rod 26 thus providing two point sliding engagement of the carriage 25 on the guide rod 26. The guide rod 26 may be referred to as the primary guide rod since it in coaction with the carriage primarily provides the guide control and stability of the vent panel 19 as the latter is caused to follow the predetermined lateral path corresponding to the curvature of the guide rods. When installed in a vehicle, the rod 26 is to the rear or aft of the rod 27.

The carriage 25 has a triangular appendage 37 which has a flange 38 substantially paralleling the flanges 33–34. The flange 36 has an oval shaped aperture 39 which receives an oval shaped bushing 41, the bushing being elongated in a direction parallel to the plane of the carriage plate 31 and being of width equal to the diameter of the secondary or forward rod 27. The flange 38 vertically lies in a plane substantially halfway between the parallel planes of the upper and lower flanges 33–34.

The secondary or forward rod 27 coacts with the bushing 41 on the carriage 25 to maintain the latter in parallel planar relationship to the inner panel or equivalent vehicle body structure during the up and down movement and parked position of the vent window panel. In the latter position, the three point stabilization is especially necessary when the vent window is mounted in a vehicle door. Whenever the vehicle door is opened and then slammed shut, the forces acting on the vent panel create a force couple on the carriage tending to rotate the latter around the guide rod 26. This force couple is balanced by the relationship of the carriage 25 to the guide rod 27.

The channel 24 carried on the carriage plate 31 is mounted on the latter intermediate the flanges 33–34 and substantially straddles the primary guide rod 26, thus minimizing any tendency of the slide member 23 to tilt or cock the carriage 25 relative to the guide rod 26.

The lower flange 34 of the carriage 25 has a right angle upwardly extending extension 42 that parallels the carriage plate 31. The extension 42 terminates some distance below the upper flange 33 of the carriage 25 but has coupled to it by a pin 43 and slot 44 connection an inverted L-shaped member 45. The base 46 of the L is contoured to fit around the guide rod 26 and carries a low friction guide shoe 47 that has bearing engagement with the guide rod (see FIG. 6).

The L-shaped member 45 is an adjustable upstop which may be adjustably positioned to ensure that the ventilation section or panel will have greater repeatability of movement to the closed or sealed position. The upstop moves along the guide rod 26 until it abuts the underside of the small angle bracket 48 beneath the mounting bracket 28.

The downstop occurs when the flange 34 of the carriage 25 abuts the lower mounting bracket 29. The point at which the downstop occurs is of minor criticality since no sealing action takes place and the vent panel is out of sight beneath the upper end of the window well.

It is to be understood that this invention is not limited to the exact construction illustrated and described above, but that various changes and modifications may be made without departing from the spirit and scope of the invention as defined in the appended claims.

We claim:

1. A vehicle window control system for controlling the movement of a window panel during the raising and lowering thereof, comprising:

a window regulator mechanism mounted on a vertical panel of a vehicle body structure and having a swingable driving arm, a primary and a secondary guide rod, each rod being longitudinally curved, separate upper and lower brackets each fastened to the vehicle body structure to provide common supports for the respective ends of the guide rods, the guide rods being positioned in parallel proximate relationship to each other with the direction of curvature of the rods extending laterally away from the vertical panel, a unitary carriage to which the window panel is directly secured, the carriage straddling the primary and secondary guide rods for slidable movement therealong, the carriage having two point engagement with the primary guide rod and single point engagement with the secondary guide rod, coupling means coupling the swingable driving arm to the carriage intermediate the two point engagement of the latter with the primary guide rod, the two point engagement of the carriage with the primary guide rod comprising upper and lower guide bushings mounted respectively in vertically spaced flanges carried on a part of the carriage, the guide bushings complementarily encompassing the primary guide rod to stabilize movement of the carriage therealong, and the one point engagement of the carriage with the secondary guide rod comprises an elongated guide bushing mounted in a third flange on the carriage, the third flange being vertically intermediate the vertically spaced flanges and integral with the same part of the carriage carrying the latter, the elongated bushing restraining the carriage against rotation around the primary guide rod.

2. A vehicle window control system according to claim 1, in which:

an upstop means is mounted on the carriage, the upstop means having bearing engagement above the carriage with the primary guide rod, the upstop means being adapted to abut the upper bracket to limit upward movement of the window panel.

3. A vehicle window control system according to claim 2, in which:

downward movement of the window is limited by abutment of the carriage with the lower bracket.

4. A vehicle window control system according to claim 3, in which:

the coupling means coupling the regulator arm to the carriage comprises a slide member carried on the end of the swingable drive arm slidable in a channel member secured to the carriage, the channel member extending laterally of the primary guide rod between the two points of engagement of the carriage with the primary guide rod.

* * * * *